US012509356B2

United States Patent
Stingl et al.

(10) Patent No.: US 12,509,356 B2
(45) Date of Patent: Dec. 30, 2025

(54) METHOD OF PRODUCING A METAL OR METAL OXIDE NANOPARTICLE

(71) Applicants: Phornano Holding GmbH, Korneuburg (AT); Instituto Federal de educação ciência e tecnologia do Sertão Pernambucano, Petrolina (BR)

(72) Inventors: Andreas Stingl, Vienna (AT); Marcelo Souza da Silva, Salgueiro (BR); Victor Alves Soares, São Cristovão (BR); Cristiane Ayala de Oliveira, Salgueiro (BR); Eriverton da Silva Rodrigues, Salgueiro (BR)

(73) Assignees: PHORNANO HOLDING GMBH, Korneuburg (AT); INSTITUTO FEDERAL DE EDUCAÇÃO,CIÊNCIA E TECNOLOGIA DO SERTÃOPERNAMBUCANO, Petrolina (BR)

( * ) Notice: Subject to any disclaimer, the term of this patent is extended or adjusted under 35 U.S.C. 154(b) by 851 days.

(21) Appl. No.: 17/642,051

(22) PCT Filed: Aug. 20, 2020

(86) PCT No.: PCT/AT2020/060310
§ 371 (c)(1),
(2) Date: Mar. 10, 2022

(87) PCT Pub. No.: WO2021/046586
PCT Pub. Date: Mar. 18, 2021

(65) Prior Publication Data
US 2023/0264969 A1    Aug. 24, 2023

(30) Foreign Application Priority Data
Sep. 13, 2019   (AT) .............................. A 50800/2019

(51) Int. Cl.
*C01G 9/02*   (2006.01)
*B82Y 30/00*   (2011.01)

(52) U.S. Cl.
CPC ................ *C01G 9/02* (2013.01); *B82Y 30/00* (2013.01); *C01P 2002/72* (2013.01);
(Continued)

(58) Field of Classification Search
None
See application file for complete search history.

(56) References Cited

U.S. PATENT DOCUMENTS 6,262,129 B1 *   7/2001   Murray ................. B82Y 30/00
                                                                 252/62.55
2007/0166541 A1 *   7/2007   Smith ..................... C04B 35/10
                                                                     428/407
2015/0303449 A1   10/2015   Oh et al.

FOREIGN PATENT DOCUMENTS

WO         2021/046586 A1     3/2021

OTHER PUBLICATIONS

Devi, G. S., et al. Synthesis of mesoporous TiO2-based powders and their gas-sensing properties. Sensors and Actuators B 87 (2002) 122-129. (Year: 2002).*

(Continued)

*Primary Examiner* — Anthony J Zimmer
*Assistant Examiner* — Zachary John Baum
(74) *Attorney, Agent, or Firm* — Edwin S. Flores; Daniel J. Chalker; Chalker Flores, LLP

(57) ABSTRACT

The invention provides a method of producing a metal or metal oxide nanoparticle comprising mixing a metal salt, a metal chelating agent, a whey protein and a reducing saccharide in a solvent; heating and evaporating the solvent from said mixture to form a gel, thereby forming metal or metal oxide nanoparticles within the gel.

17 Claims, 4 Drawing Sheets

(52) U.S. Cl.
CPC ...... *C01P 2002/74* (2013.01); *C01P 2002/88* (2013.01); *C01P 2004/04* (2013.01); *C01P 2004/64* (2013.01)

(56) References Cited

OTHER PUBLICATIONS

Shalaby, A., et al. A study on the effect of citric acid on the crystallinity of ZnO/TiO2 nanopowders. Journal of Chemical Technology and Metallurgy, 48, 6, 2013, 585-590. (Year: 2013).*

Choppali, U. and Gorman, B. P. Structural and optical properties of nanocrystalline ZnO thin films synthesized by the citrate precursor route. Journal of Luminescence 128 (2008) 1641-1648. (Year: 2008).*

Carvalho, Juliane Doering Gasparin et al. "The quality of Minas Frescal cheese produced by diVerent technological processes" Food Control 18.3 (2007): 262-267.

Danks, A. E. et al. "The evolution of 'sol-gel' chemistry as a technique for materials synthesis" Mater. Horiz., 2016, 3, 91-112.

Diario Oficial da Uniao No. 69, quinta-feira, 11 de abril de 2013, 6.

Mohapatra, D.P. et al. "Photocatalytic degradation of carbamazepine in wastewater by using a new class of whey-stabilized nanocrystalline TiO2 and ZnO" Science of the Total Environment 485-486 (2014) 263-269.

Mutilangi, W.A.M. et al. "Functional Properties of Hydrolysates from Proteolysis of Heat-denatured Whey Protein Isolate" Journal of Food Science—vol. 61, No. 2, 1996, 270-275.

Pouliot, Yves et al. "Effect of peptide distribution on the fractionation of whey protein hydrolysates by nanofiltration membranes" Lait 80 (2000) 113-122.

Shi, L. et al. "Low temperature fabrication of ZnO-whey protein isolate nanocomposite" Materials Letters 62 (2008) 4383-4385.

Nair, Binoj et al. "Coalescence of Nanoclusters and Formation of Submicron Crystallites Assisted by Lactobacillus Strain" Crystal Growth & Design, vol. 2, No. 4, 2002, 293-298.

Gülseren, Ibrahim et al. "Zinc incorporation capacity of whey protein nanoparticles prepared with desolvation with ethanol" Food Chemistry, 135 (2012) 770-774.

Teixeira, L.V. et al. "Perfil fisico-químico do soro de queijos mozarela e minas-padrão produzidos em várias regiões do estado de Minas Gerais" Arq. Bras. Med. Vet. Zootec., v.60, n. 1, p. 243-250, 2008.

* cited by examiner

METHOD OF PRODUCING A METAL OR METAL OXIDE NANOPARTICLE

CROSS-REFERENCE TO RELATED APPLICATIONS

This application is the National Stage of International Application No. PCT/AT2020/060310, filed on Aug. 20, 2020, claiming the priority of AT A 50800/2019, filed on Sep. 13, 2019, the content of each of which is incorporated by reference herein.

FIELD OF THE INVENTION

The present invention relates to methods of producing metal and metal oxide nanoparticles and the obtained nanoparticles.

BACKGROUND OF THE INVENTION

Nanoparticles are a part of nanomaterials that have a size in the range of 1-500 nm in at least one of their dimensions. Nanoparticles have been a common material for the development of new cutting-edge applications in communications, energy storage, sensing, data storage, optics, transmission, environmental protection, cosmetics, biology, and medicine due to their important optical, electrical, and magnetic properties.

Various methods to produce metal and metal oxide nanoparticles exist, among them the sol-gel method, which has been reviewed in Dankes et al., Mater. Horiz. 3, 2016: 91. The method includes the synthesis of solid materials such as metal oxides from solution-state precursors. These can include metal alkoxides that crosslink to form gels, metal hydroxide sols (Mohapatra et al., Science of the Total Environment 485-486 (2014) 263-269) but also metal ion-chelate complexes or organic polymer gels containing metal species. The choice of reactants can have a significant impact on the structure and composition of the solid product.

WO 2018/019595 discloses micrometer-sized crystals of zinc oxide, which comprise entrapped particles of protein.

KR20180104386 (A)—English summary, describes a biodegradable nanocompo-site hydrogel containing a biopolymer and metallic nanoparticles.

CN101664563(A)—English summary, describes a method for producing an anti-bacterial hydrogel dressing using ZnO nanoparticles.

A common sol-gel method is the synthesis of metal oxide nanoparticles in the presence of a polymer gel, such as the ones formed by ethylene glycol (U.S. Pat. No. 3,330,697 A). This method has the draw back that the resulting particles have a relatively large size distribution (high polydispersity) and that the use of synthetic polymers is not environmentally friendly.

It is therefore a goal to provide alternative methods of producing metal oxide nanoparticles that provide highly uniform particle sizes and are friendlier to the environment as well as to extend the environmentally friendly method to metallic nanoparticles.

SUMMARY OF THE INVENTION

The present invention provides a method of producing a metal as well as metal oxide nanoparticle comprising mixing a metal salt, a metal chelating agent, a whey protein or whey polypeptide and optionally a reducing saccharide in a solvent; heating and evaporating the solvent from said mixture to form a gel, thereby forming metal or metal oxide nanoparticles within the gel.

Related thereto, the invention further provides a method of producing a metal or metal oxide nanoparticle comprising mixing a metal salt, a metal chelating agent and whey in a solvent; heating and evaporating the solvent from said mixture to form a gel, thereby forming metal or metal oxide nanoparticles within the gel.

The invention further provides nanoparticles and compositions of nanoparticles obtainable from such methods. E.g. provided is a composition comprising a plurality of metal or metal oxide nanoparticles, wherein the metal or metal oxide nanoparticles have an average size of up to 200 nm in the longest dimension and wherein less than 0.1% of the metal or metal oxide nanoparticles deviate in their size by more than 50% from the average size. Further provided is a composition comprising a plurality of metal or metal oxide nanoparticles, wherein the metal or metal oxide nanoparticles have an average size of 3 nm to 200 nm in the longest dimension and wherein the metal or metal oxide nanoparticles comprise 0.2 to 1 mol-% Ca and/or 0.5 to 4 mol-% K.

All aspects relate the invention equally and all detailed descriptions and all preferred embodiments relate to all these aspects. In particular, method descriptions relate to the nanoparticles and compositions as obtainable from such methods. Description of the nanoparticles and compositions can describe the product of the methods.

DETAILED DESCRIPTION OF THE INVENTION

The inventive method uses a metal salt, a metal chelating agent, a whey protein and a reducing saccharide—or simply a metal salt, a metal chelating agent and whey—to produce metal or metal oxide nanoparticles (also referred to simply as "nanoparticles" herein"). The nanoparticles can be produced in a sol-gel method. In this method, a mixture of these components can be heated to form a gel in a solvent. In this process, a chelating agent is used, most often citric acid, to surround aqueous cations and sterically entrap them. The presence of whey proteins supports this process and forms an entrapping matrix together with the chelating agent. Subsequently a polymer matrix is formed to immobilize the chelated cations in a gel or resin.

"Metal or metal oxide" are collectively referred to as "metal (oxide)". Whether a metal nanoparticle or metal oxide nanoparticle forms depends on the oxidative conditions (e.g. with or without oxygen access; presence and amount of reducing agents) and the nature of the metal material. Noble metals, such as Ag and Au have higher tendency to form metal nanoparticles instead of metal oxides even under (weak) oxidative conditions. If a noble metal like Ag or Au should turn to metal oxides usually additional oxidizers are needed.

Within the gel the metal (oxide) nanoparticles are formed during heating, which usually involves evaporation of the solvent and optionally pyrolysis of the gel and chelating agent and to remove the nanoparticles from said gel. Preferably, the resulting polymer is then combusted under oxidising conditions to remove organic content and yield a product (oxide) with homogeneously dispersed cations. Usually oxygen is allowed access to facilitate the oxidizing conditions. Oxygen access can be provided from air. Oxygen can oxidize the metal or simply replace the salt of the metal salt to form the metal oxide. In case of noble metal nanoparticles (Ag, Au) under ambient atmosphere, oxidation is prevented by the confinement of the reduced metallic atoms/clusters provided by the gel matrix.

In preferred embodiments the method comprises mixing a reducing saccharide with the metal salt. Such a reducing saccharide may already be present in whey and no additional step may be needed in this case. A reducing saccharide is also referred to as reducing sugar. It may be a carbohydrate that has an anomeric carbon—it has an open-chain form with an aldehyde group. The aldehyde functional group is easily deprotonated and allows the reducing saccharide to act as a reducing agent.

The presence of reducing saccharide can support the reduction of the metal cations to a lower oxidation state or even to metallic state. This benefits the formation of a homogenous dispersion and to obtain monodisperse products. Of course, in case of metal oxides, eventually, the metal converts to the metal oxide which may include oxidation under oxidizing conditions.

Preferably the reducing saccharide is a monosaccharide or disaccharide, such as lactose. Lactose is usually abundantly found in whey. The mono- or disaccharide may e.g. comprise fructose, glucose and galactose units.

In preferred embodiments, the whey protein is selected from a lactalbumin, such as α-lactalbumin, β-lactoglobulin; serum albumin and immunoglobulins. Preferably it is a lactalbumin, especially preferred α-lactalbumin, which yields highly monodisperse nanoparticles, presumably by forming a highly suitable matrix for the entrapment process of the metal. In some embodiments native whey proteins are used; in other embodiments heat- and/or pH-denatured proteins may be used.

Whey or whey proteins may also be hydrolysed to provide whey polypeptides; such polypeptides as whey hydrolysate are fragments of whey proteins that maintain the gelling ability of whey proteins. These can be used in addition or as alternatives to whey proteins or whey in the inventive methods. These hydrolysates/polypeptides can be produced by enzymatic physical or chemical degradation of whey proteins. The level of degradation can be controlled by intensity and duration of the treatment. Desired fragments can further be selected by separation techniques, like ultrafiltration. Preferred is enzymatic digestion with enzymes like trypsin, chymotrypsin, alcalase, neutrase or combinations thereof (Mutilangi et al., Journal of Food Science 61(2), 1996: 270; Pouliot et al., Lait 80, 2000:113-122). Preferably, the whey polypeptide is selected from hydrolysates of α-lactalbumin, β-lactoglobulin, serum albumin and immunoglobalins, especially preferred of lactoglobulin. Preferably the polypeptides have at least 1 kDa, especially preferred at least 1.5 Da, at least 2 kDa or at least 2.4 kDa.

The whey protein and/or whey polypeptides may be isolated and purified, e.g. to 80% or more purity (% in mass-%). Preferably the purity of isolated whey protein is at least 90%, or at least 95% or even at least 99%. Purity is given as solid fraction of a composition, ex-cluding any solvent.

For simplicity, whey is used, i.e. without isolating whey protein from other whey components. The inventive method may comprise mixing a metal salt, a metal chelating agent and whey in a solvent; heating and evaporating the solvent from said mixture to form a gel, thereby forming metal (oxide) nanoparticles within the gel. During heating, preferably oxygen access is allowed as mentioned above.

Typical whey comprises lactose, a disaccharide, responsible for the reduction of metal ions (such as Zn, Ti, Ag, Au); and soluble proteins that are responsible for the formation of the gel, which provides a polymeric matrix. It acts as a confinement and nucleation site for the reduced metal. The nucleation sites formed by whey are much more sensitive to temperature and pH, compared to those formed by ethylene glycol polymerization, induced by citric acid. Such the process allows being adapted for a larger range of particle size. The proteins present in whey stand out due to their high biological value. They are rich in branched chain essential amino acids, leucine, isoleucine, valine. Whey may further comprise salt components such as K- and Ca-ions, which may appear in the metal oxide nanoparticle as doping components. The whey used in the inventive method may comprise any one or more components of the above.

The abundance of sulfhydryl amino acid residues is a beneficial property of the whey proteins. This feature allows whey proteins to form inter-molecular covalent bonds during high-temperature and mild acidic processing, with subsequent formation of a gel matrix. The pores of the matrix are determined by means of the length of intermolecular covalent bonds between proteins, aggregated protein residues and peptides, which can be tuned by means of pH and may vary between a few, normally 2 nm up to >100 nm in diameter. The pores act as nucleation sites for the formation of the nanoparticles, providing ideal charge density and tunable steric confined nucleation sites.

Whey is preferably whey from bovine, sheep, buffalo or goat milk.

Whey as used according to the invention may have a protein content of 0.5 g/100 g (g protein per 100 g whey) to 5 g/100 g; it may have a water content of 85%-95% (mass-%); it may have a carbohydrate content of 2 g/100 g to 8 g/100 g (g carbohydrate per 100 g whey); in particular, it may comprise reducing saccharides, such as lactose, at a concentration of 1 g/100 g to 7 g/100 g (g reducing saccharide, e.g. lactose, per 100 g whey), or any combination of these concentrations. Of course, whey may be thickened to reduce the water content and increase the concentration of the listed components, such as by a factor of ×1.5, ×2, ×3, ×4, etc.

Preferably the mixture as used in the gel formation comprising the metal salt, the chelating agent and whey protein (or whey, or whey polypeptide) are preferably used at natural or mild acidic pH, such as at a pH of 4.5 to 8, preferably 5.5 to 7.5, such as 6.5 to 7.2.

The solvent is preferably an aqueous solvent, preferably water.

The inventive method further comprises the step of heating and evaporating the solvent from said mixture to form a gel. Heating is performed until a gel is formed, e.g. at a temperature of 50° C. to 90° C. Preferably this heating step is performed for 20 min or more, such as 30 min to 4 h or 40 min to 3 h. Evaporation leads to the formation of a xerogel and the metal (oxide) nanoparticles form within the gel. Further heating to remove the solvent may be at e.g. 80° C. to 110° C., depending on the solvent and pressure. Higher temperatures may lead to the decomposition of the gel which transits to an optional next step: removal of the gel, preferably by calcination or pyrolysis. Such a step can be added to obtain the nanoparticles free from the gel. Such a decomposition may occur e.g. at heating may e.g. be to 200° C. or more, such as 300° C. or more, 400° C. or more, 500° C. or more, 600° C. or more, 700° C. or more, 800° C. or more, 900° C. or more, preferably at 200° C.-800° C. or more, e.g. up to 1000° C. or even more. The temperature is one contributor to control nanoparticle size. A preferred temperature range for the heating step is 300° C. to 600° C. This range produces nanoparticles of desirable size of e.g. 10 nm to 40 nm.

The chelating agent is a ligand that forms two or more separate coordinate bonds to the metal as central atom of the coordination bond. The chelating agent is polydentate to form multiple bonds, i.e. at least two, with the metal. Accordingly, the chelating agent may comprise two or more functional groups to form coordination bonds with the metal. Preferably the functional groups are carboxylic acid groups, amine groups, tertiary amine groups, hydroxyl groups, thiol groups. E.g., the chelating agent can be a 2-4 valent carboxylic acid, preferably citric acid. Further chelating agents are ethylenediaminetetraacetic acid, methylglycinediacetic acid, ethylenediamine-N,N'-disuccinic acid, porphine, a cobalamine (vitamin β-12; with or without cobalt), dimercaprol (2,3-dimercapto-1-propanol) and L-glutamic acid N,N-diacetic acid.

Preferably, the molar ratio of the chelating agent and the metal(s) to form the metal oxide nanoparticles is from 6:1 to 1:1, preferably from 5:1 to 2:1.

Preferably the mass ratio of citric acid (water-free mass) to whey is in the range of 2:1 to 1:50, such as 1:1 to 1:10, preferably 1:1.5 to 1:5, especially preferred 1:2. In further preferred embodiments, the mass ratio of citric acid (water-free mass) to whey protein or whey polypeptides (dry mass) is in the range of 10:1 to 100:1, such as 5:1 to 40:1, preferably 10:1 to 30:1, especially preferred 20:1.

The mixture may optionally comprise a reductase enzyme, preferably a reductase enzyme from whey. Reductases present in whey help to keep the ideal charge distribution until their combination with oxygen.

In the inventive method, whey proteins/whey controls the size and morphology of the metal (oxide) nanoparticles in a sol-gel method. Sol-gel methods can be used to form a large variety of metal (oxide) nanoparticles. The method is applicable to all metals. The metal of the metal salt and the formed metal (oxide) nanoparticle may be any one of interest and e.g. selected from Fe (iron), Co (cobalt), Ti (titanium), Zn (zinc), Zr (zirconium), Ce (cerium), Li (lithium), Mn (manganese), Ag (silver), Ni (nickel), Sn (tin), Au (gold) or mixtures thereof, such as LiMn, LiTi, LiCo etc. Zn (zinc), Ti (titanium), Ag (silver) are particular preferred as they have many uses and form excellent nanoparticles with the inventive whey-based method.

Preferably the metal oxide is of formula MeO, with Me being a metal and O oxygen. Such a metal oxide has the metal in oxidation state 2+. In further embodiments, the oxidation state of the metal can be 1+, 2+, 3+, 4+, 5+, 6+ or mixtures thereof. Example metal oxides are $SnO$, $TiO_2$, $CO_3O_4$, $Fe_2O_3$, $Fe_3O_4$, $CeO_2$, $Ce_2O_3$, $LiCoO_2$, $LiMn_2O_4$, $Li_2Ti_3O_7$. Preferred example metals that are not processed to oxides are Ag and Au. Preferably the metals are selected from metals that form nitrates and sulphates.

In preferments, the metal salt is water soluble. Preferably it is a metal halide, e.g. fluoride, chloride, bromide, iodide; nitrate, sulphate, acetate or phosphate. The metal salt should easily dissolve to allow coordination of the metal with the chelating agent. Otherwise, the nature of the salt forming counterion is of no consequence.

The present invention further provides a composition comprising a plurality of metal (oxide) nanoparticles obtainable by the inventive methods. Such a composition may comprise nanoparticles, wherein the metal (oxide) nanoparticles have an average size of 2 nm to 200 nm, preferably 3 nm to 10 nm, in the longest dimension and wherein less than 0.1% of the metal oxide nanoparticles deviate in their size by more than 50% from the average size. Size is grain size, as measured by TEM.

Further provided is a composition comprising a plurality of metal (oxide) nanoparticles, wherein the metal oxide nanoparticles have an average size of 2 nm to 200 nm in the longest dimension and wherein the metal oxide nanoparticles comprise 0.1 to 1 mol-% Ca and/or 0.2 to 4 mol-% K and/or 0.1 to 3 mol-% P. The presence of Ca (calcium), K (potassium) and optionally P (phosphorous) are indicators of the inventive method and can be used to identify nanoparticles that have been prepared environmentally-friendly with the inventive method.

Preferably the nanoparticles comprise 45 mol-% to 49 mol.-% of the metal (Me), preferably Zn, Ti, Ag. Compositions of the nanoparticles may be determined after calcination, and oxygen removal. Then the residual composition preferably comprises 96% to 99.5% Me, preferably Zn, Ti, Ag, and preferably the above-mentioned indicators, e.g. at 0.2 to 1 mol-% Ca and/or 0.4 to 4 mol-% K and/or 0.2 to 3 mol-% P.

Preferably the metal (oxide) nanoparticles have an average size in the range of 2 nm to 200 nm, in particular preferred 3 nm to 150 nm, 4 nm to 120 nm, 5 nm to 100 nm, 6 nm to 80 nm, 7 nm to 60 nm, 8 nm to 50 nm, 9 nm to 40 nm, 10 nm to 30 nm, and any range in between these values. In particular small particles, e.g. with an average size of 20 nm or less, e.g. 3 nm to 15 nm, or 15 nm or less or 10 nm or less, are particularly beneficial and can be efficiently and homogenously be produced by the inventive method. These sizes relate to sizes in the longest dimension of the particle. Preferably, the nanoparticles are essentially round or spherical, with the shortest and longest dimension of a nanoparticle differing by at most 25% of the length in the longest dimension in at least 90% of the nanoparticles of the composition, preferably in at least 95% of the nanoparticles of the composition.

As to the size distribution between the individual nanoparticles, this is usually small due to high homogeneity of the essentially monodisperse particles of the invention. Preferably, less than 0.1%, e.g. less than 0.05%, of the metal oxide nanoparticles deviate in their size by more than 50%, or more than 30% or more than 20%, from the average size. Size is grain size, as measured by TEM.

The inventive fabrication process may lead to nanoparticles that comprise functional groups and metals at their surface originated by the denaturation of whey-peptides and proteins, specially the lactoglobulins—if not removed. These functional groups allow a wide range of applications in health and agriculture due to the intrinsic properties of metal or metallic oxides in nanoparticles (e.g.: antimicrobial agent, optical and electronic properties). Whey manufactured metal or metal oxide nanoparticles are intrinsically biocompatible due to these functional groups and the lack of toxic residuals from other methods, like the ethylene glycol method. In vivo, the biocompatible nanoparticles would not cause toxic reactions due to the absence of such toxic residuals.

In some embodiments, the metal (oxide) nanoparticles comprise an organic compound or functional groups selected from whey pyrolysis or calcination products on their surface. Such organic compounds/functional groups of the whey pyrolysis or calcination products may comprise an alkylnitrile, benzyl nitrile, sulphydryl/disulphide, a phenol, a benzenealkylnitrile, toluene, furfural, 2,5-dimethyl, furan, levoglucosenone, levoglucosan, 3-methyl-pentanoic acid, 5-methyl-2-furancarboxaldehyde, acetamide, picolinamide, 3-pyridinol, indole, sulfur groups, thiol groups.

Usually, the metallic (oxide) nanoparticles produced by the fabrication process using whey are of grey color in contrast to the white colored metallic oxide nanoparticles produced by conventional methods such as when ethylene glycol is used instead of whey proteins or whey. The grey color is not aesthetic but a result of the whey-based production method and its impact on the nanoparticle structure, in particular the presence of organic compound or functional groups on the surface of the particles. In particular embodiments, the appearance is according to colour code #eeeeee or RGB (238, 238, 238) or darker, such as #e0e0e0 or RGB (224, 224, 224). In another colour scale, preferably the colour is RAL 9003 or darker (corresponds to RGB (236, 236, 231) or darker). Preferably the colour values of the three colours of the RGB scale (red, green, blue) is approximately the same, such as within a range of 10% or less of each others, e.g. within 5% or less of each others.

The inventive composition may be provided as a powder, e.g. as a dry powder. Other compositions may be provided as suspension in a fluid, such as an aqueous medium.

Preferably the composition comprises a plurality of nanoparticles, such as 1000 nanoparticles or more, e.g. 10,000 nanoparticles or more.

The nanoparticles or composition may be used for various uses, such as for applications as hygienic product, e.g. as antimicrobial agent; in biomedicine, e.g. as biological marker; in particular ZnO and $TiO_2$ in cosmetics, e.g. as sunscreen; in chemistry, e.g. as catalyst. For example, ZnO is an attractive semiconducting material for short-wavelength optoelectronic applications owing to its wide band gap 3.37 eV, large bond strength, and large exciton binding energy (60 meV) at room temperature. As a wide band gap material, ZnO is used in solid state blue to ultraviolet (UV) optoelectronics, including laser developments. In addition, due to its non-centrosymmetric crystallographic phase, ZnO shows the piezoelectric property, which is highly useful for the fabrication of devices, such as electromagnetic coupled sensors and actuators.

Depending on the metal oxide material, the band gap can be shifted by either changing the chemical composition (inclusion of doping elements) or by changing the nanoparticle size (Fernández-Garcia and Rodriguez, Metal Oxide Nanoparticles, DOI: 10.1002/9781119951438.eibc0331). Such changes can of course also be introduced into the inventive nanoparticles. Size can be controlled in the manufacturing process, e.g. by increasing the concentration of the gel-forming materials (whey protein and/or the chelating agent) which increases confinement, and increasing the temperature as mentioned above. Doping elements that can be included to change the ban gap are e.g. Cr, Fe, Ni, Zn etc., in essence any other metal that by itself could also be used to form metal oxide nanoparticles. Such doped metal oxide nanoparticles are thus nanoparticles of metal mixtures, such as CrMg, FeMg, NiMg, ZnMg etc. Doping metals are usually in a smaller concentration that the main metal, such as at 0.10% to 10%, preferably 1% to 8% or 3% to 7% (all mol-%), of the metal content of the metal oxide nanoparticle.

The present invention is further illustrated by the following figures and examples, without being limited to these embodiments of the invention.

FIGURES

Figure 3:
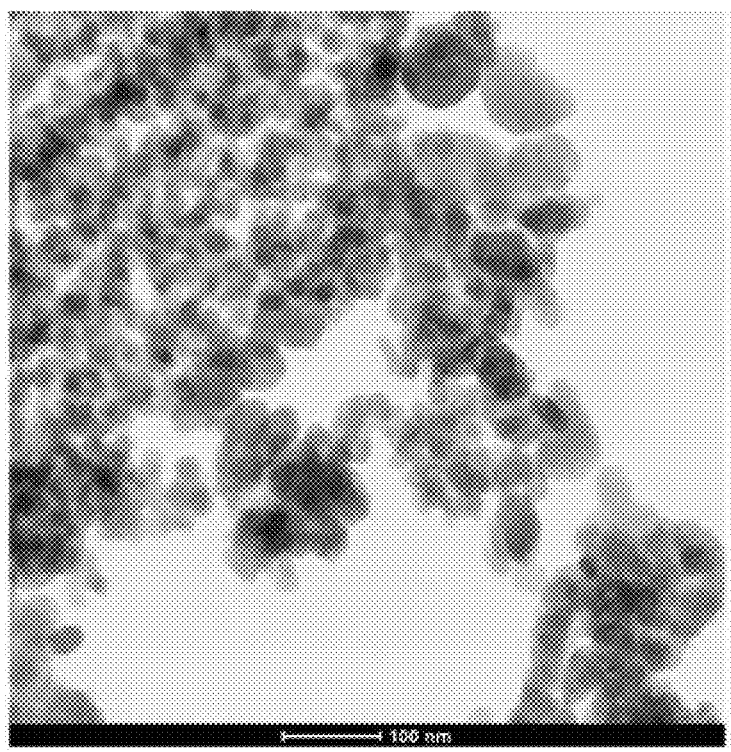

FIG. 3 shows a TEM image of zinc oxide nanoparticles prepared by a comparative example using ethylene glycol as gelling agent. The particles are polydisperse with many larger particles (see upper right). The nanoparticles were produced by calcination at 600° C. for 1 h. 100 nm scale bar.

Figure 4:
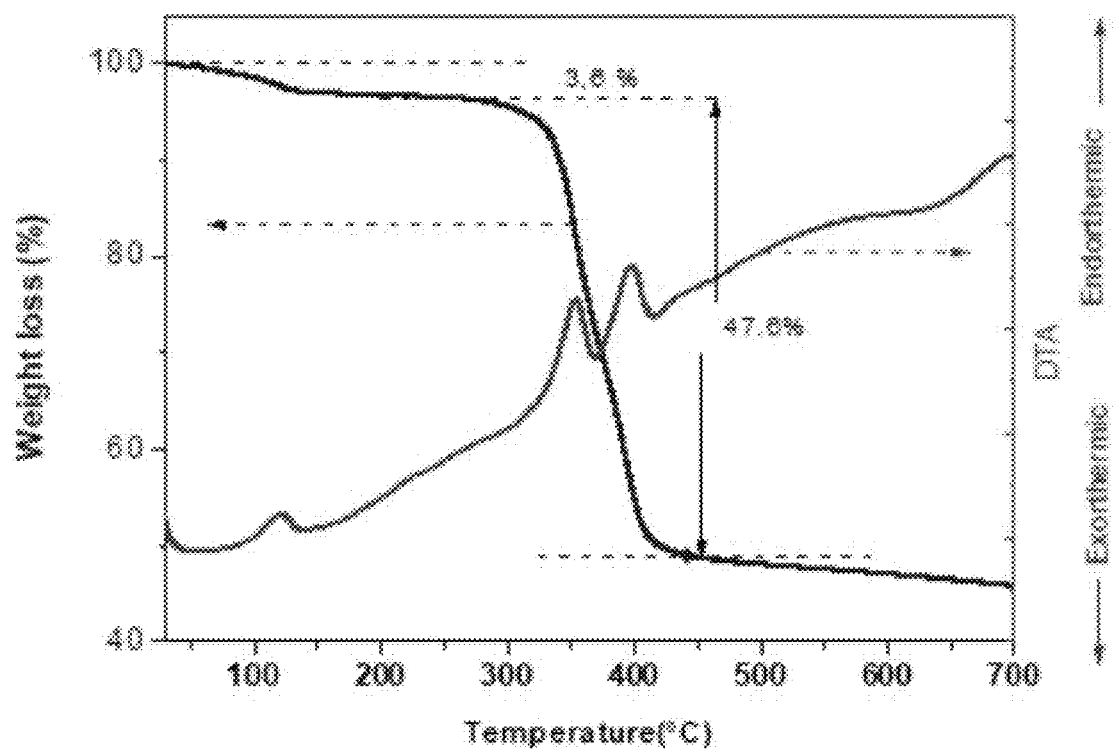

FIG. 4 shows thermogravimetric (TGA) and differential thermal analysis (DTA) of ZnO xerogels.

Figure 5:
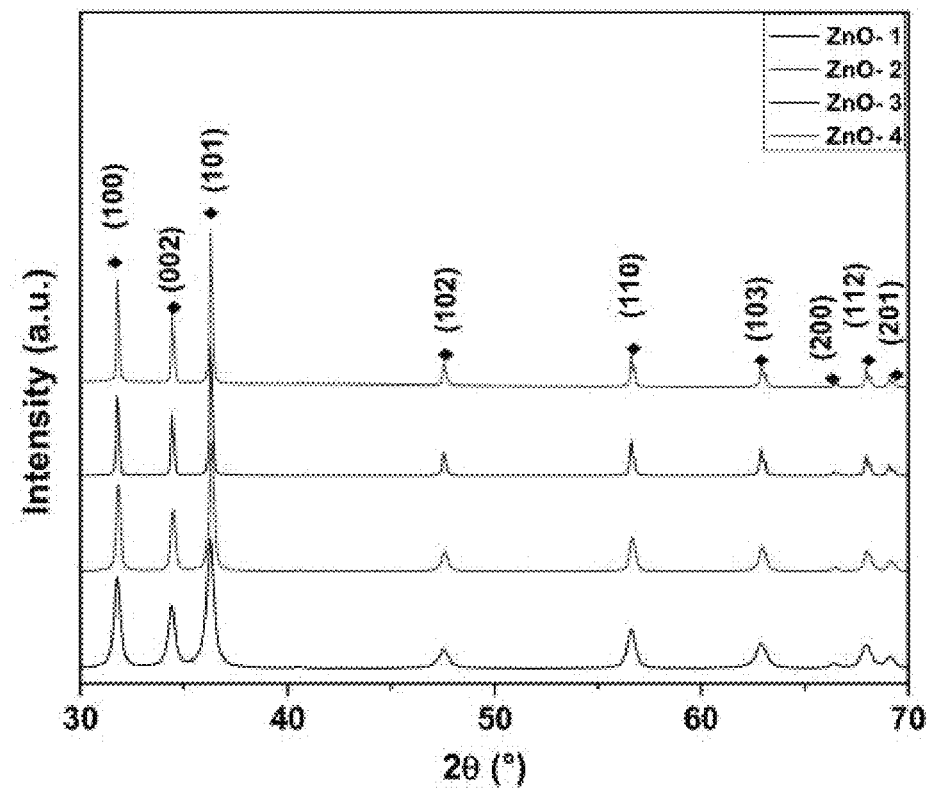

FIG. 5 shows the XRD patterns (crystalline structure) of the ZnO nanoparticles calcined at different temperatures.

Figure 6:
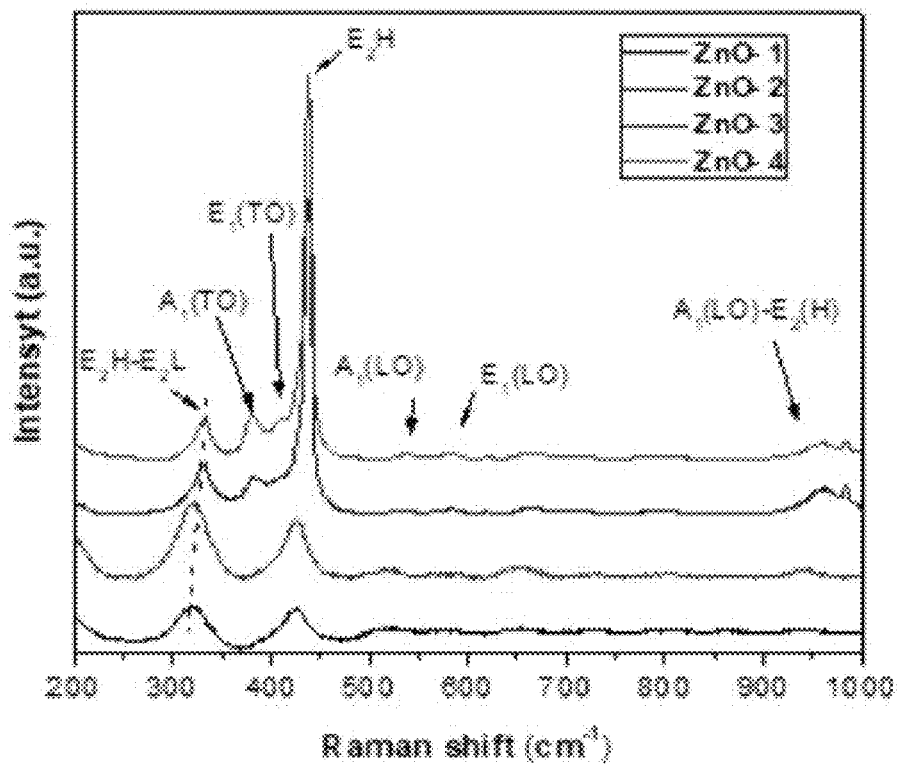

FIG. 6 presents the Raman spectrum of the ZnO nanoparticles in the spectral range of 200-1000 $cm^{-1}$.

Figure 7:
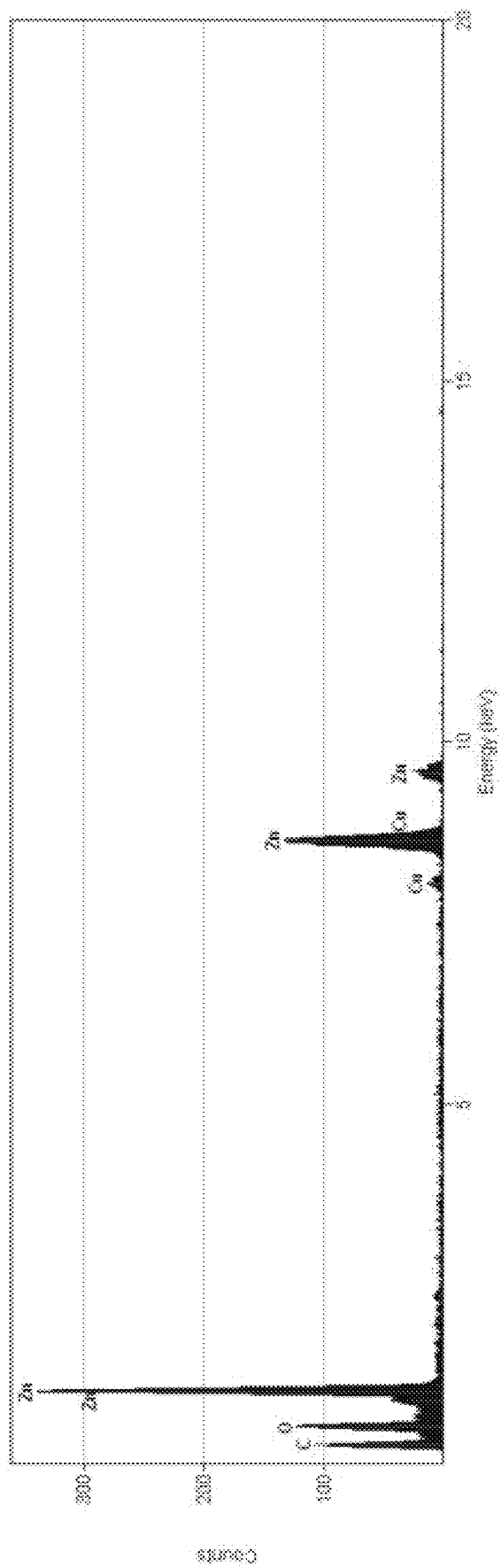

FIG. 7 shows an EDS spectrum of ZnO nanoparticles.

EXAMPLES

Comparative Example

ZnO nanoparticles were synthesized by using the Pechini method (U.S. Pat. No. 3,330,697; reviewed in Dankes et al., Mater. Horiz., 2016, 3, 91). Zinc citrate was prepared using zinc nitrate hexahydrate ($Zn(NO3)2.6H2O$) (Sigma-Aldrich), mixed with citric acid (CA) ($C6H8O7·H2O$) (Sigma-Aldrich) as a chelating agent, previously dissolved in distilled water (0.1 g/ml), in molar ratios of 1:3. Ethylene glycol (E) (Sigma-Aldrich) was then added to the solution, in the mass ratio of CA:E=60:40, to promote gel formation of the citrate. The starting materials are then, mixed, homogenized and kept under magnetic stirring for 1 h at 100° C. until gel formation. A brown colored resin is obtained by heating the sample at 200° C. in an oven to remove the water. Then the resin is calcinated at temperature ranging from 400-800° C. for 1 h to obtain the resultant ZnO nanoparticles.

Example 1: Obtaining, Treatment and Characterization of Whey

Fresh liquid whey from Minas Frescal (Carvalho et al., Food Control 18(3), 2007: 262-267) cheese production was used in the laboratory. The whey obtained was duly pasteurized, bagged, in 1 l milk bags, and frozen, stored in a freezer until the moment of use. The pasteurized serum was characterized, physically and chemically, by determining, in triplicate, the following analyses:
1. Acidity in degrees Dornic (° D)—10 mL of the sample was transferred with a volumetric pipet to a 100 mL beaker, then 5 drops of 1% phenolphthalein solution (brand Neon) was added and titrated with sodium hydroxide solution (Vetec brand) N/9, using a 10 mL buret or Dornic acidometer, until a pinkish color appeared. The reading was made and the result given in degrees Dornic, and each 0.1 ml of the N/9 sodium hydroxide solution corresponds to 1° D.
2. pH, through direct measurement in potentiometer;
3. Desiccation loss (humidity)—Direct drying in oven at 105° C.—The samples were evap-orated in a hot plate until the consistency was pasty, then weighed 2 to 10 g of the sample in porcelain capsule, previously tared. This was heated for 3 h in a greenhouse and cooled in a desiccator to room temperature, then weighed, repeating the heating and cooling operation to constant weight. The calculation was carried out using the following formula:

100*N/P=moisture or volatile substances at 105° C.
percent m/m

With N=number of humidity grams (loss of mass in g); P=number of grams of the sample.

4. Ash, by incineration in muffle furnace at 550° C.;
5. Density at 15° C.; Total Protein; Fat; Defoamed dry extract; Lactose; Water added; Freezing point and total solids through the Ultrasonic Milk Analyzer—Lactoscan SLP (manufacturer: Entelbra SA);
6. Carbohydrate content was obtained by the difference between the total sample mass (100%) and the contents of humidity, proteins, fat, ash, etc.

TABLE 1

Results of the characterization of whey:

| Parameter | measurement | Teixeira and Fonseca (2008) | Brasil (2013) |
|---|---|---|---|
| pH | 6.12 ± 0.02 | 6.3 | 6.0-6.8 |
| Acidity (° D) | 11.66 ± 0.02 | 12.49 | 8-14 |
| Density (g/mL) | 1025 ± 0.15 | 1.024 | — |
| Humidity (g/100 g) | 90.69 ± 0.84 | 93.72 | — |
| Fat (g/100 g) | 0.92 ± 0.03 | 0.68 | — |
| Proteins (g/100 g) | 2.38 | 0.84 | — |
| Ash (g/100 g) | 0.71 ± 0.11 | 0.49 | — |
| Carbohydrates (g/100 g) | 5.28 | — | — |
| Lactose (g/100 g) | 3.58 | 4.12 | — |
| ESD (g/100 g) | 6.52 ± 0.01 | — | — |
| Cryoscopy (° H) | −0.39 | −0.55 | — |

References: Teixeira and Fonseca, Arquivo Brasileiro de Medicina Veterinária e Zootecnia 60(1), 2008: 243-250; Ministério da Agricultura Pecuária e Abasteci-mento, BRASIL, "Regulamento Técnico de Identidade e Qualidade de Soro de Leite," Diário Oficial da União, Brasilia, DF, pp. Portaria n° 53, 10 Apr. 2013. The values of acidity and pH found for whey in normal ranges. The values of acidity and pH are related directly to the total bacterial count, since these bacteria ferment lactose present in the milk, forming lactic acid, which increases the acidity and consequently decreases the pH. The composition of the whey can vary with the following aspects: type of cheese to be manufactured, type of coagulation used, composition of milk, cattle feed and others.

Whey is a product resulting from precipitation of milk fats and casein during cheese fabrication and accounts for 85 to 90% of milk volume, but also retains most of the nutrients of milk.

Example 2: Experimental Synthesis to Obtain 10 g Nanoparticles

Zinc oxide (ZnO) nanoparticles were synthesized using a whey assisted sol-gel method. In a modified protein sol-gel method, whey was successfully used as a size-limiting gelling agent to obtain nanostructured ZnO. The synthesized nanoparticles were characterized by Transmission electronic microscopy (TEM). The diameters of the particles were measured and the size was in the range of 20-50 nm.

The material used for synthesis:
73 g zinc nitrate ($Zn(NO_3)_2 \cdot 6H_2O$)
75 mL deionized water ($H_2O$)
80 g citric acid ($C_6H_8O_7 \cdot H_2O$)
150 mL whey The sol-gel method was chosen to prepare the nanoparticles, since it allows mixing the initial reagent at an atomic level and has good reproducibility. This method also allows control of chemical composition and homogeneous materials in its composition reducing the possibility of having impurities that are difficult to detect. The sol-gel method has certain advantages over other chemical forms of preparation of metal oxide nanoparticles, providing faster nucleation and growth and can be used for large-scale industrial production of nano-powders. In addition, the use of whey in this process is advantageous over other high cost methods of the precursors for obtaining metal nanomaterials. Nanoparticles of ZnO were synthesized by a sol-gel route using whey as a polymerization agent. Zinc citrate was prepared using zinc nitrate hexahydrate, mixed with citric acid (CA) as a chelating agent, previously dissolved in distilled water (0.1 g/ml), in the molar ratio of approximately 1:1.5. The whey was then added to this solution, in the mass ratio of approximately CA:whey=1:2, to promote the polymerization of citrate. The starting materials were mixed and homogenized and kept under magnetic stirring for 1 h at 80° C. until gelatinization, a stable resin with a brown color and transparent appearance was then obtained (xerogel) and heated to 100° C. to eliminate excess of water. Thereafter, the xerogel was calcined at temperatures of 200° C., 400° C., 800° C. and 1000° C. for 1 h to obtain the resulting ZnO nanoparticles.

It is important to emphasize that the whey:
1.) Provides a polymer matrix that confines the metal ions. As the solution is dehydrated it polymerizes (Puff formation), forming a resin of a chemical environment of biological origin that changes the surface of the particles.
2.) acts as a thickening and gelling agent, which improves the stability of the puff.

Figure 1:
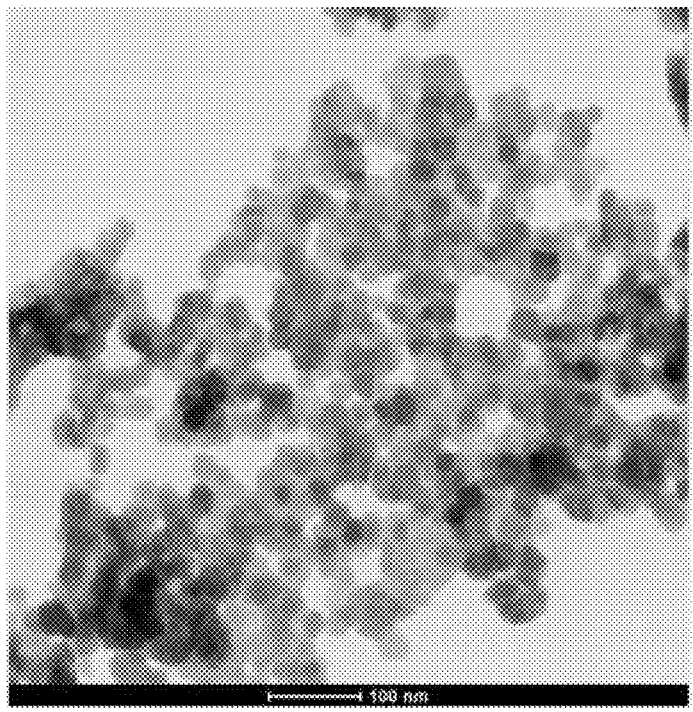
FIG. 1 shows a Transmission electronic microscopy (TEM) image of many inventive zinc oxide nanoparticles having a homogenous size of about 20 nm. The nanoparticles were produced by calcination at 600° C. for 1 h. 100 nm scale bar.
Figure 2:
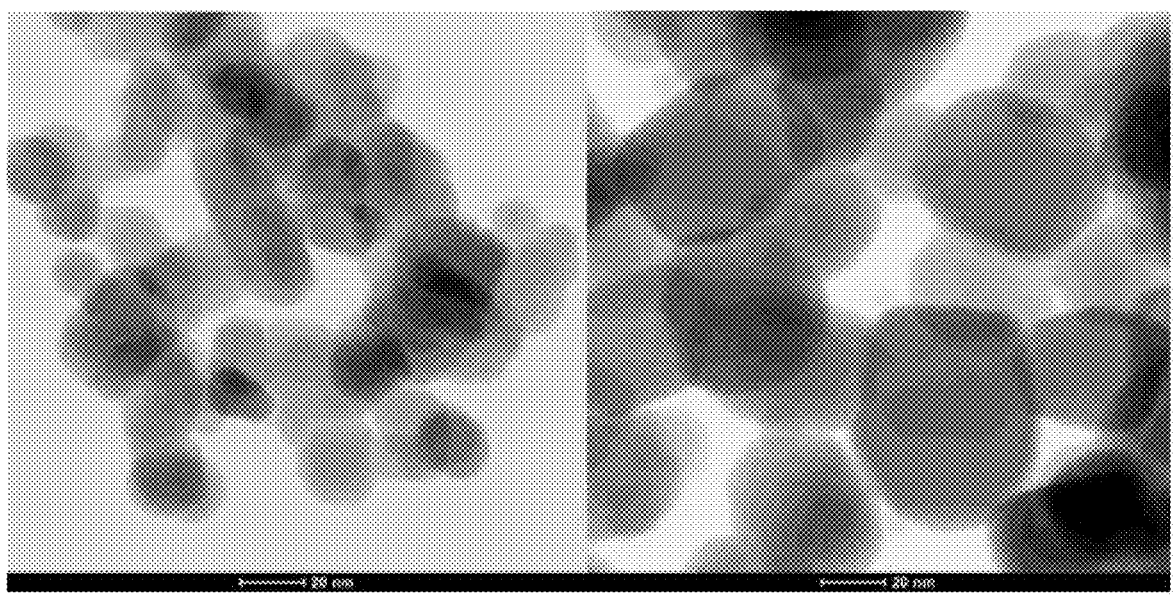
FIG. 2 shows TEM images of zinc oxide nanoparticles having a size of about 20 (left) or 50 nm (right). 20 nm scale bar.

The size of the zinc oxide nanoparticles obtained according to the method of the present invention is controlled by the temperature. FIG. 2 shows nanoparticles of 20 nm or 50 nm as determined by Transmission Electron Microscopy (TEM). According to the present invention, it is possible to produce highly uniform and stable metal oxide nanoparticles using an environmentally friendly synthesis. Due to using whey, the stability is improved.

The whey sol-gel method proved to be highly efficient for the synthesis of crystalline ZnO nanoparticles. The present investigations confirm that whey is a useful chelating agent to prepare ZnO nanoparticles with good crystallinity, high purity, control of crystallite size, and an ecologically friendly synthesis, substituting ethylene glycol. The nanoparticle composition had a grey appearance, i.e. color of code #e0e0e0 (RGB: 224, 224, 224).

Example 3: Effect of Whey in Comparison with Other Reagents

Table 2 presents the average particle sizes for the ZnO samples, comparing different reagents. Whey is more efficient than ethylene glycol (EG) in obtaining smaller particles.

TABLE 2

Estimated particle size of the ZnO powder after calcination as a result of different temperatures with ethylene glycol, whey and citrate only.

| Temperature of 1 hour calcination process | With Ethyleneglycol (EG) | With Whey | Without agents, with citrate only |
|---|---|---|---|
| 400° C. | 18 nm | 6 nm | Polydispers*) |
| 600° C. | 26 nm | 15 nm | Polydispers*) |

TABLE 2-continued

Estimated particle size of the ZnO powder
after calcination as a result of different
temperatures with ethylene glycol, whey and citrate only.

| Temperature of 1 hour calcination process | With Ethylene-glycol (EG) | With Whey | Without agents, with citrate only |
|---|---|---|---|
| 800° C. | 34 nm | 30 nm | Polydispers*) |
| 1000° C. | 200 nm | 120 nm | Polydispers*) |

*)Size and form are not controlled, dispersity is large, NPs are formed from very small (few nm) to very large (few 100 nm) at the same time in the same process.

With whey, smaller nanoparticles are possible, compared to EG-manufactured ones (see Table 2). A larger range of different sizes of ZnO NPs can be produced in a reproducible manner using whey. The size of the ZnO nanoparticles is a function of the temperature, pH and concentration of the whey. Consequently, a larger variation of the bandgap is possible as compared to EG produced ZnO NPs. This manifests itself in a variation of the optical absorption spectrum.

Ethylene glycol is a petroleum-based material, while whey is a renewable, sustainable product as well as a side product from cheese production. Using whey allows recycling of waste from the dairy industry. Whey is rich in protein and sucrose. The sol-gel method is the method chosen for the synthesis of nanoparticles.

Example 4: Characterization of ZnO Nanoparticles

Table 3 presents the average crystallite sizes and lattice parameters for ZnO samples produced by calcination at different temperatures. TEM: Transmission electronic microscopy, XRF: X-ray fluorescence spectroscopy, XRD: X-ray diffraction.

TABLE 3

| Nomenclature | T (° C.) | Grain size-TEM (nm) | Crystallite size - XRD (nm) | Lattice constants (nm) | | Unit cell volume (nm³) |
|---|---|---|---|---|---|---|
| | | | | a = b | c | |
| ZnO-1 | 400 | 20.5 | 18.3 | 3.2511(8) | 5.2110(8) | 47.702 |
| ZnO-2 | 600 | 36.1 | 33.7 | 3.2497(9) | 5.2102(7) | 47.654 |
| ZnO-3 | 800 | 72.0 | 75.1 | 3.2531(4) | 5.2108(9) | 47.758 |
| ZnO-4 | 1000 | 120.1 | 88.6 | 3.2500(7) | 5.2101(8) | 47.661 |

| | ZnO-1 | ZnO-2 | ZnO-3 |
|---|---|---|---|
| Mg | 0.07 | 0.12 | 0.07 |
| Al | 0.03 | 0.05 | 0.03 |
| Si | 0.04 | 0.09 | 0.06 |
| P | 0.39 | 0.61 | 0.37 |
| S | 0.05 | 0.10 | 0.06 |
| K | 1.76 | 1.45 | 0.89 |
| Ca | 0.52 | 0.69 | 0.54 |
| Fe | Nd | 0.01 | Nd |
| Ti | 0.01 | Nd | Nd |
| Ni | Tr | 0.01 | 0.01 |
| Zn | 97.13 | 96.87 | 97.91 |
| Ag | Nd | Nd | 0.06 |
| Mo | Nd | 0.01 | Nd |
| Total | 100.00 | 100.00 | 100.00 |

Table 4 shows XRF data of the ZnO nanoparticles calcined at different temperatures. Nd stands for not detectable and Tr stands for traces.

Thermogravimetric (TGA) and differential thermal analysis (DTA) of the ZnO xerogels are shown in FIG. 4.

FIG. 5 shows the XRD patterns (crystalline structure) of the ZnO nanoparticles calcined at different temperatures. FIG. 6 presents the Raman spectra of the ZnO nanoparticles in the spectral range of 200-1000 $cm^{-1}$. FIG. 7 shows an EDS spectrum.

The invention claimed is:

1. A method of producing a metal oxide or metal nanoparticle comprising mixing a metal salt, a metal chelating agent and a whey protein or whey polypeptide in a solvent; heating and evaporating solvent from said mixture to form a gel, thereby forming metal oxide or metal nanoparticles within the gel.

2. The method of claim 1, wherein the whey protein is selected from α-lactalbumin, β-lactoglobulin, serum albumin and immunoglobulins; and/or the whey polypeptide is selected from hydrolysates of α-lactalbumin, β-lactoglobulin, serum albumin and immunoglobulins comprising polypeptides with at least 1 kDa.

3. The method of claim 1, further comprising mixing a reducing saccharide with the metal salt.

4. A method of producing a metal or metal oxide nanoparticle comprising mixing a metal salt, a metal chelating agent and whey in a solvent; heating and evaporating solvent from said mixture to form a gel, thereby forming metal or metal oxide nanoparticles within the gel.

5. The method of claim 1, further comprising removal of the gel.

6. The method of claim 1, further comprising a reductase enzyme.

7. The method of claim 1, wherein the chelating agent is a 2-4 valent carboxylic acid.

8. The method of claim 1, wherein the metal oxide is of formula MeO, with Me being a metal.

9. The method of claim 1, wherein the metal is zinc.

10. The method of claim 1, wherein the metal oxide is selected from $TiO_2$, $CO_3O_4$, $Fe_2O_3$, $Fe_3O_4$, $CeO_2$, $Ce_2O_3$, $LiCoO_2$, $LiMn_2O_4$, $Li_2Ti_3O$.

11. The method of claim 1, wherein the metal salt is water soluble.

12. The method of claim 3, wherein the reducing saccharide is a monosaccharide, disaccharide, or lactose.

13. The method of claim 5, wherein the removal of the gel is by calcination.

14. The method of claim 6, wherein the reductase enzyme is a whey reductase enzyme.

15. The method of claim 7, wherein the chelating agent is citric acid.

16. The method of claim 11, wherein the metal salt is a metal chloride or nitrate.

17. The method of claim 1, wherein the chelating agent comprises at least two functional groups selected from carboxylic acid groups, amine groups, tertiary amine groups, thiol groups.

* * * * *